April 25, 1961 J. W. CROWE ET AL 2,981,933

MULTISTABLE CIRCUIT

Filed Nov. 19, 1956 4 Sheets-Sheet 1

April 25, 1961 J. W. CROWE ET AL 2,981,933

MULTISTABLE CIRCUIT

Filed Nov. 19, 1956 4 Sheets-Sheet 2

INVENTORS
JAMES W. CROWE
BENNETT HOUSMAN
BY Ralph L. Thomas
ATTORNEY

April 25, 1961 J. W. CROWE ET AL 2,981,933

MULTISTABLE CIRCUIT

Filed Nov. 19, 1956

4 Sheets-Sheet 4

United States Patent Office 2,981,933

Patented Apr. 25, 1961

2,981,933

MULTISTABLE CIRCUIT

James W. Crowe, Hyde Park, and Bennett Housman, Poughkeepsie, N.Y., assignors to International Business Machines Corporation, New York, N.Y., a corporation of New York Filed Nov. 19, 1956, Ser. No. 622,902

8 Claims. (Cl. 340—174)

This invention relates to electrical and magnetic circuits and more particularly to such circuits employing superconductive materials in multistable devices.

After the discovery in 1911 by Kamerlingh Onnes of the phenomenon whereby the electrical resistance of a body of material disappears at a given temperature, various scientific investigations in this field have resulted in many findings some of which were not readily predicted, if predictable at all. The findings in some instances are related by various writers to classical theories for explanation. In other instances the findings are presented phenomenologically since some classical theories fail to provide a complete explanation. The characteristic of some twenty-one elements, numerous compounds and countless alloys to change from a resistive or normal state to a condition of zero electrical resistance at given temperatures is referred to as superconductivity. When a material undergoes such a transition, it is appropriately termed a superconductor, and the temperature at which the transistion takes place in a material is referred to as the critical temperature. The critical temperature varies with the different materials, and for each material this temperature is lowered as the intensity of the magnetic field around the material is increased from zero. Once a body of material is rendered superconductive, it may be restored to the resistive or normal state by the application of a magnetic field of given intensity and the magnetic field necessary to destroy superconductivity is designated the critical field. Magnetic field intensity regardless of direction appears to be the controlling influence which destroys superconductivity. Many writings with a thorough and detailed presentation of the phenomena and theories relating to superconductivity are available, one of which is "Cambridge Monographs on Physics" (Superconductivity) Second Edition by D. Schoenberg. A description of one practical arrangement for securing low temperatures as well as one type of superconductive element which may be employed for various functions is presented in an article entitled "The Cryotron—A Superconductive Computer Component" by D. A. Buck in the Proceedings of the I.R.E. for April 1956.

According to the present invention a unique and novel arrangement including superconductive materials is provided which serves as a multistable device. In one of its basic forms the invention includes a body of thin superconductive material, of relatively large critical magnetic field, having a plurality of apertures or holes therein and magnetic field producing means operable to selectively establish a magnetic field which links given ones of said apertures. Once established in selected holes, a magnetic field approximately equal in intensity to the critical magnetic field is trapped in the thin body of material when the magnetic field producing means is deenergized, and the trapped magnetic field may be continued indefinitely provided the operating temperature is maintained sufficiently low. The intensity of the trapped magnetic field is preferably high, and for this reason a superconductive material is selected which has a relatively large critical magnetic field. Associated with the body of superconductive material in one or more locations, depending on the number of apertures, are individual superconductive sense wires or lines having a relatively low critical magnetic field. Each sense wire is positioned at a location which puts it under the influence of a trapped magnetic field when one is present at this location, and for this purpose the sense wire is preferably, though not necessarily, associated with an aperture of the body of superconductive material. Each of the sense wires is preferably so arranged that it secures the maximum normalizing effect of a trapped magnetic flux and at the same time presents a minimum magnetic field therearound as a result of current therethrough. Each of the various sense wires may be connected in series with individual load devices, and in a preferred arrangement the load devices are superconductive devices having either no resistance or a resistance which is relatively small in comparison to the resistance of a normal sense wire. If the various sense wires and serially associated load devices are connected as a group in parallel to a current source, it is seen that if one sense wire remains superconductive while remaining sense wires are normal, then any applied current passes through the superconductive sense wire to its associated load device, this being the path of least resistance to current flow. Otherwise stated, little or no current flows through the normal or resistive sense wires because of their relatively high resistive value. In a preferred arrangement all but one of the sense wires are made normal by establishing trapped flux in all but a selected one of the apertures in the body of superconductive material, where such trapped magnetic field is sufficiently strong to render normal the sense wire associated therewith. A further novel aspect is the use in the magnetic field producing means of superconductive drive lines which are arranged in the form of a coil which produces as large a magnetic field as possible with a given amplitude of current. The critical magnetic field is made equal to or less than the field of trapped flux so that when a trapped flux is present, the associated coil is rendered normal. If all coils are connected in parallel to a current source and established trapped fields render normal all but one coil, the one coil remains superconductive and a current flow is shunted through the superconductive coil the energization of which is effective to create a different stable condition. In a similar manner successive current pulses change the existing stable state to another stable state.

Accordingly, it is an object of the present invention to provide a novel multistable circuit.

Another object of the present invention is to provide a new and novel multistable circuit employing superconductive elements.

A further object of the present invention is to provide a multistable circuit which employs trapped magnetic fields in a body of superconductive material to represent stable states.

Yet another object of the present invention is to provide a superconductive drive means which in response to a current automatically establishes in a body of superconductive material another stable state determined by the trapped magnetic fields of the existing stable state.

Still another object of the present invention is to provide a multistable superconductive device which may be interrogated by non-destructive sensing means.

Another object of the present invention is to provide a novel multistable device having a speed of operation limited primarily by the time it takes a magnetic field to establish itself in a superconductor, being on the order of $10^{-9}$ seconds.

Another object of the present invention is to provide a novel arrangement of superconductive components into a multistable device which because of its simple construction is relatively inexpensive to manufacture and maintain, yet is highly reliable, physically compact and small.

Other objects of the invention will be pointed out in the following description and claims and illustrated in the accompanying drawings, which disclose, by way of example, the principle of the invention and the best mode, which has been contemplated, of applying that principle.

Figure 8B:
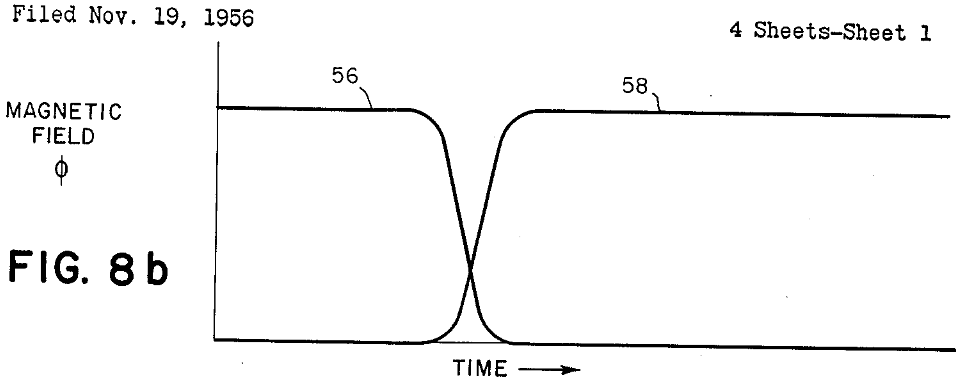
Figure 8C:
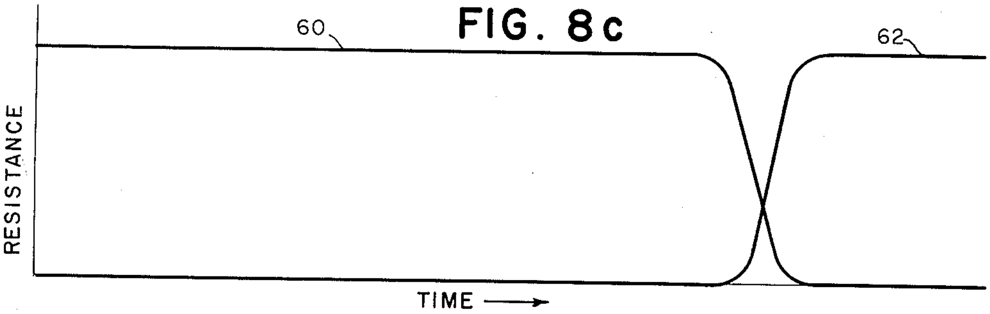
Figure 8A:
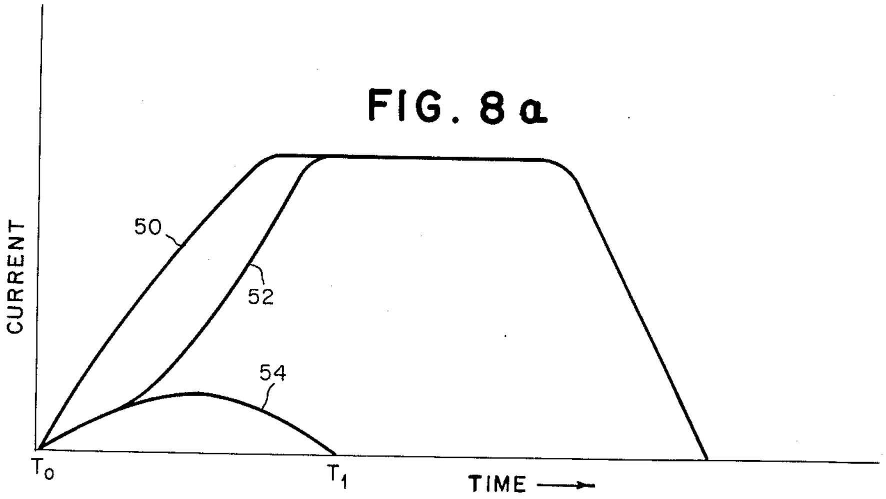
Figure 4:
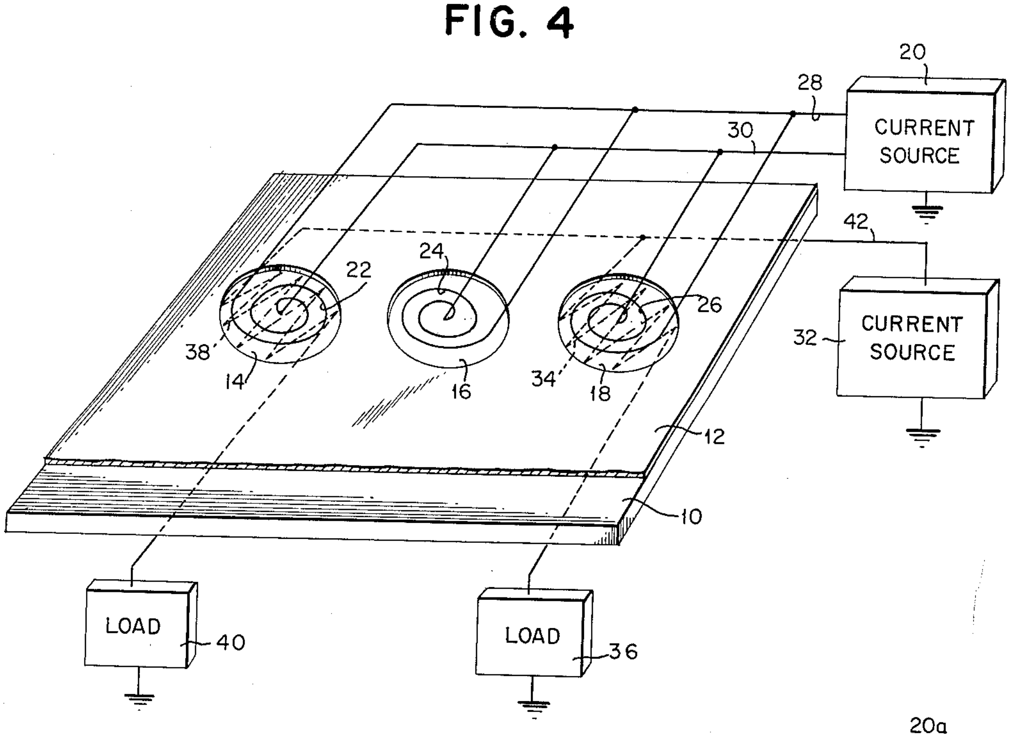
Fig. 4 is a composite showing of the features illustrated in Figs. 1–3.
Figure 5:
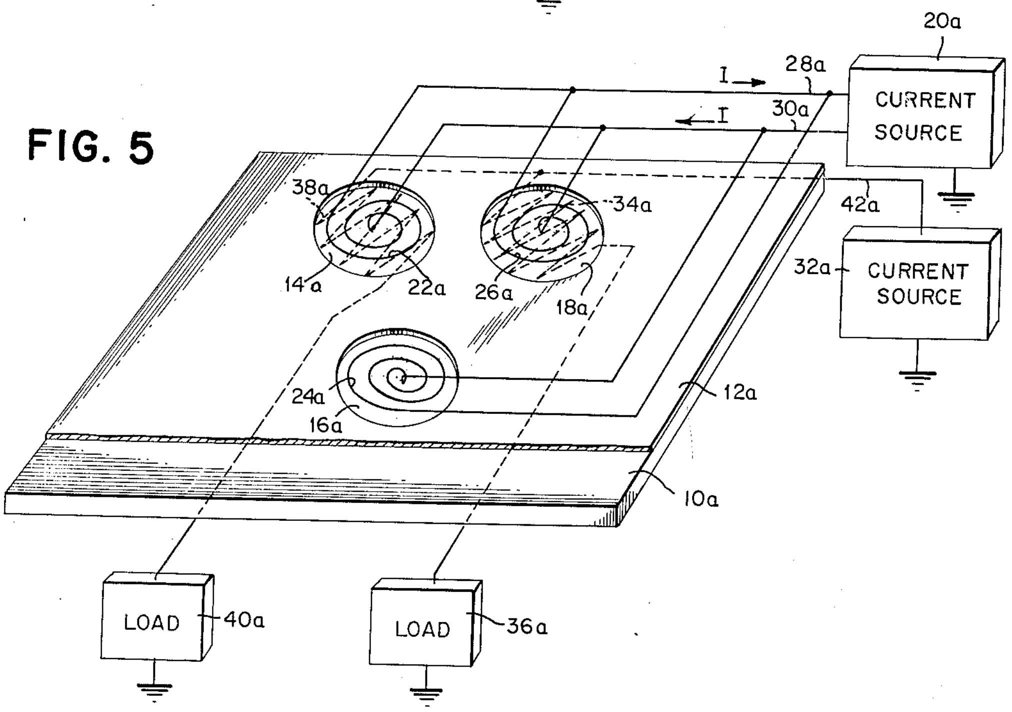
Fig. 5 is a view of another arrangement according to the present invention.

Figs. 8*a*, 8*b* and 8*c* show a series of curves used to illustrate the operation of the circuits of Figs. 4 and 5.

Figure 9:
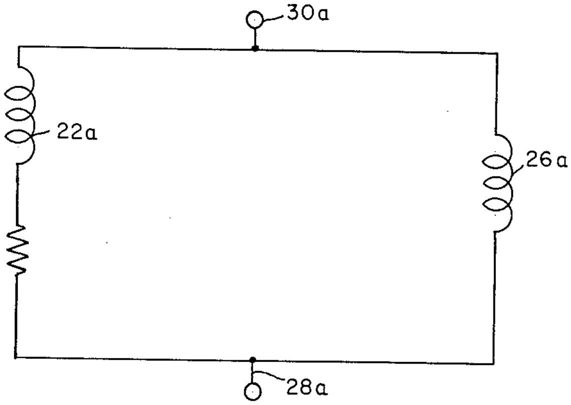

Fig. 9 is an equivalent circuit diagram of the devices of Figs. 4 and 5 with one drive coil omitted.

Figure 10:
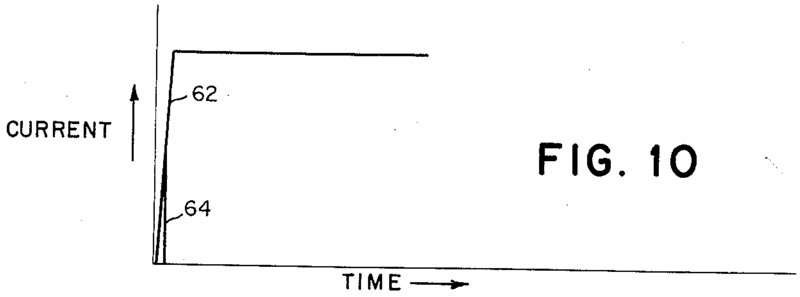

Fig. 10 is a plot of current versus time used to illustrate the operation of a device according to Fig. 9.

With reference to the drawing, the invention is illustrated in some of its various aspects. In one form, for example, the construction may include the arrangement of Fig. 1 wherein a substrate 10 of non-magnetic material is sufficiently strong to support a superconductive plate or film 12 vacuum-metalized or otherwise printed thereon. Magnetic fields trapped in any two of the several apertures designated by 14, 16 and 18 in the superconductive film 12 may be employed to represent stable states. For simplicity three holes only are shown, but it is to be understood that more holes may be suitably employed. In order to establish trapped magnetic lines of flux linking a pair of these holes, a device for producing a magnetic field is provided which includes a current source 20 and parallel connected spiral coils 22, 24 and 26 as shown separately in Fig. 2 for ease of viewing. If a current flows from the current source 20 along a conductor 30, through the coil 22 and back along a conductor 28, it is readily seen that a magnetic field tends to be established which is down through the center of this coil and up along the sides. If a current flows from the current source 20 along the conductor 30 through the coil 24 and back along the conductor 28, a magnetic field tends to be established which is up through the coil 24 and down along the sides. With a similar current the direction of the magnetic field produced by the coil 26 is like that in the coil 24. The coils 22, 24 and 26 are made of a superconductive material which has a relatively low critical magnetic field. In fact the intensity of the critical magnetic field should be equal to or less than the intensity of the trapped magnetic field so that when a trapped magnetic field links a pair of apertures in the film 12, the associated coils are rendered normal. Since two of the coils 22, 24 or 26 are normal when trapped flux links two adjacent holes, when a current flows from the current source 20 out along the line 30 and back on line 28, most of the current shunts the pair of normal coils and flows through the superconducting coil; at least it does initially because the normal coils offer a resistance to current flow while the superconductive coil offers none. As a result a relatively strong field is established through the superconductive coil the effect of which is to shift a trapped magnetic field from the pair of holes it occupies to the pair of holes including the hole having the superconductive coil and one hole of the pair. A subsequent current flow causes the trapped magnetic field to be re-established in the initial pair of coils. In the arrangement of Fig. 2 the trapped magnetic field links the pair of holes 14 and 16 or the pair of holes 16 and 18, but not both pairs of holes simultaneously, and changes back and forth between these pairs of holes in response to successive current pulses. Thus either the hole 14 or the hole 18 is void of trapped magnetic flux during a condition of stability; whereas the hole 16 contains trapped magnetic flux under any condition of stability.

Figure 2:
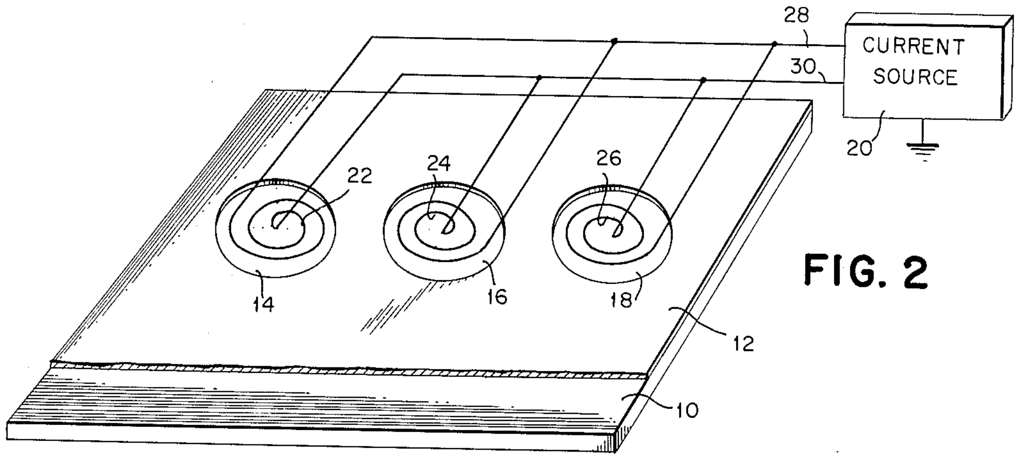
Fig. 2 is a view of the arrangement of Fig. 1 with a magnetic field producing device added.
Figure 3:
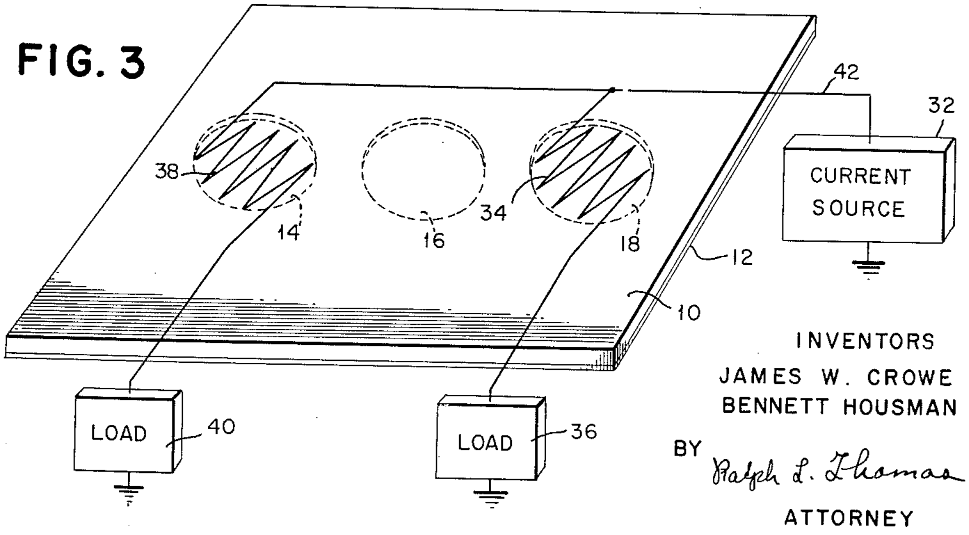
Fig. 3 is a bottom view of the arrangement of Fig. 1 with a sense mechanism added.

For the purpose of sensing the state of the device in Fig. 2, a circuit of the type shown in Fig. 3 may be employed. Fig. 3 is a bottom view of the substrate 10 and the film 12 of Fig. 2 with the sense mechanism added. A current source 32 is parallel connected with a first branch comprising a sense wire 34 serially connected with a load 36 and a second branch comprising a sense wire 38 serially connected with a load 40. The sense wires 34 and 38 are superconductors having a critical field the intensity of which is less than the intensity of the magnetic field trapped in holes 14 and 16 or in holes 16 and 18. If a magnetic field is trapped in the holes 14 and 16, then the sense wire 38 being under the influence of this magnetic field is rendered normal while the sense wire 34 being under the influence of no magnetic field, or very little if any, is continued superconductive. If a current pulse is then established on line 42 by the current source 32, the current shunts the resistive sense wire 38 and flows through the non-resistive sense wire 34 and the load 36. The load devices 36 and 40, shown in block form, are preferably superconductive devices presenting little or no resistance to current flow so that the resistance of the normal sense wire, not the resistances of the loads, controls the division of current through the parallel sense circuits. The resistance of the load devices in many practical arrangements may be some value which is relatively small in comparison to the resistance of the sense wires 34 and 38, thereby insuring that the shunting effect of the superconductive sense wire during a sense operation is controlling. If the load devices include resistance which cannot be reduced as is sometimes the case, the resistance of the normal sense wire may be increased to some suitable value relatively higher (1) by selecting a material having higher normal resistance, (2) by increasing the number of the zig-zag portions shown associated with the trapped field, or (3) by a combination of (1) and (2).

Figure 1:
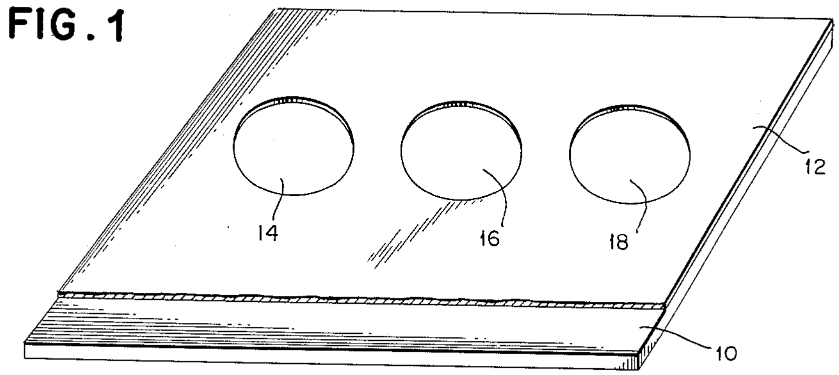
Fig. 1 is a view of one arrangement according to the present invention showing partial construction.

A composite arrangement of the structural features shown independently in Figs. 1 through 3 is presented in Fig. 4. In view of the foregoing discussion it is seen that the device in Fig. 4 is capable of assuming either of two stable conditions of trapped magnetic lines of flux, i.e., flux linking the pair of holes 14 and 16 or the pair of holes 16 and 18 as the result of a current pulse from the current source 20. Furthermore the stable states may be reversed, sometimes termed complementing, by successive pulses from the current source 20. Also, nondestructive sensing is available by supplying a current from the current source 32 to the conductor 42 which current is diverted by the normal one of the sense wires 34 or 38 to the superconductive one of these wires and its associated load.

The holes in the film 12 of Fig. 4 may be arranged in many geometrical configurations, and it is to be understood that the arrangement of holes in Fig. 4 is by way of illustration. As a further example, an alternative arrangement of the multistable circuit of Fig. 4 is shown in Fig. 5 wherein the various conditions of stability are secured with the holes oriented differently. The parts in Fig. 5 corresponding to similar parts in Fig. 4 employ the same reference numeral with the letter "*a*" affixed. Flux is trapped in the pair of holes **14*a* and 16*a* or in the pair of holes 16*a* and 18*a* as a result of a current pulse through the lines 28*a* and 30*a* from the current source 20*a*. The stable states may be alternately established by successive pulses from the current source 20*a*. The stable state at any instant may be sensed by current from the current source 32a, which may be a D.C. level or a pulse, on the conductor 42a. The amplitude of this current is such that the resulting magnetic field created around the conductor 42a is less than the critical magnetic field of this conductor and less than the critical magnetic field of the sense wires 34a and 38a where the two parts are constructed of different superconductive materials as is sometimes the case. The sensing operation is nondestructive because current in the conductor 42a does not change the stable condition of magnetic lines of flux trapped in the pair of holes 14a, 16a or the pair of holes 16a, 18a. It is pointed out that the influence on trapped flux of the magnetic field created by the sense wires 34a or 38a in respective holes 18a and 14a is kept at a minimum by the zig-zag arrangement of these wires across the holes. Current flow in alternate sections of the zig-zag pattern creates magnetic fields in opposition with each other which tend to cancel out in part. Mutual inductance of the sense wires is minimized, thereby presenting a minimum undesirable magnetic influence in response to current flow during a sense operation. In other words current through the sense wires 34a and 38a does not change the state of the flip-flop because substantially no net flux is generated. To illustrate, for example, assume that magnetic lines of flux are trapped linking the holes 14a and 16a when a sense current is applied to the conductor 42a. This current is diverted by the resistive condition of the sense wire 38a to the sense wire 34a and the load 36a. The magnetic field created around the sense wire 34a fails to transfer the magnetic lines of flux linking the holes 14a and 16a to the condition where magnetic lines of flux would link the holes 16a and 18a because the sense wire 34a is so wound that the magnetic field resulting from current through one of the zig-zag legs in one direction is balanced out by the magnetic field resulting from current flow in the opposite direction in an adjacent zig-zag leg. Accordingly very little if any net flux results from a current through the sense wire 34a. The same explanation is true with respect to current through the sense wire 38a where trapped magnetic flux links the holes 16a and 18a. In addition the zig-zag feature insures that as much as possible of the sense wire 34a or 38a** is subjected to the utmost influence of the trapped magnetic lines of flux in the associated hole. This insures that as much resistance as possible is established in the sense wire under the influence of a trapped magnetic field, thereby insuring that a sense current is diverted to the other sense wire in the superconductive state.

The transition time, the time for destroying superconductivity of the drive windings in the circuits of Figs. 4 and 5, is considered longer than the time required for switching a trapped magnetic field from one pair of holes to another pair. For example, the time required for switching a trapped magnetic field from one pair of holes to another pair may be on the order of 0.1 microsecond whereas the transition time of the superconductive drive winding may be on the order of 0.15 microsecond. Hence a current pulse of short duration may be employed to switch a trapped magnetic field from one location to another without dissipating much heat in the subject drive coil.

In order to illustrate the operation of the device in Fig. 4, let it be assumed that initially no flux threads any of the holes 14, 16 and 18. If a pulse from the pulse source 20 is applied to the coils 14, 16 and 18, it can be seen that the current sees three paths, each of which has zero resistance. It is problematical which path the current will take, but if one path is taken to the exclusion of the remaining two, this path will eventually become normal under the influence of the current. In so doing, the remaining two paths serve to divert current at this point because they offer zero resistance. Here again it is problematical which one of the two remaining paths the current will take, but assuming that one path is taken to the exclusion of the other, then this path will subsequently go normal. At this point the remaining path of zero resistance serves to shunt current from the two resistive paths and in the process it goes normal. Hence all three of the drive coils eventually go normal under the influence of current from the pulse source 20. If current flows from the source 20 along the conductor 30 through the coils 22, 24 and 26 and back along the conductor 28, magnetic lines of flux are established which are up through the center of the coils 24 and 26 and down through the coil 22. It can be seen that a stronger mutual field exists the direction of which is down through the hole 14 and up through the hole 16 than would exist down through the hole 14 and up through the hole 18. The field in a direction which is down through the hole 14 and up through the hole 18 is assumed negligibly small, if existing at all. When current from the source 20 is terminated, a magnetic field is trapped in the holes 14 and 16, the direction of which is down through the hole 14 and up through the hole 16. From the foregoing it can be seen that the final result of the current applied to the coils 22, 24 and 26 from the pulse source 20 is to leave a magnetic field in a direction which is down through the hole 14 and up through the hole 16 although in the process the sequence by which these fields are established in the holes 14, 16 and 18 would vary according to the manner in which the coils 22, 24 and 26 go normal. The trapped magnetic field in a direction which is down through the hole 14 and up through the hole 16 may be said to represent binary one. If another current in the same direction is applied to the coils 22, 24 and 26, the coils 22 and 24 present a resistance to current flow because they are rendered normal by the trapped magnetic field, and hence the current travels through the coil 26 which offers zero resistance because it is superconductive. Accordingly a field of relatively large intensity is established which is up through the coil 26. The field of relatively high intensity tending to come up through the hole 18 is for a short instant unable to complete a path through the hole 14 or the hole 16 because the superconductive material which separates these holes acts as a barrier. It is recalled that a field established near a superconductor is unable to penetrate the superconductor unless the superconductor goes normal. Therefore the magnetic field established in the coil 26 reaches an intensity sufficiently high to cause the area around the hole 18 to go normal. The area of normal regions expands toward the hole 16, and as soon as a normal path is established between the holes 16 and 18, the closed lines of magnetic flux looping down through the hole 14 and up through the hole 16 tend to travel through the normal regions between the holes 16 and 18 toward the hole 18. At this instant complete lines of magnetic flux loop up through the hole 18 and down through the hole 14 in a continuous path, and the flux in the hole 16 is assumed to be zero. As the magnetic lines of flux travel from the hole 16 through the normal regions to the hole 18, the normal regions revert to their superconductive state behind the magnetic lines of flux as they progress toward the hole 18. At this point it can be seen that the mean magnetic path of the lines of flux looping down through the hole 14 and up through the hole 18 is longer than it was when looping down through the hole 14 and up through the hole 16. The circulating currents existing around the hole 14 are increased greatly over those that existed around this hole when the magnetic field looped through the holes 14 and 16. This increased current around the hole 14 is sufficiently great to cause regions between the hole 14 and the hole 16 to go normal. Consequently the magnetic field in the hole 14 travels through the normal regions toward the hole 16. In the process the normal regions revert to their superconductive state behind the magnetic field as it travels through the normal regions from the hole 14 to the hole 16. At this point it can be seen that a magnetic field is established in a direction which is down in the hole 16 and up in the hole 18, and there is no magnetic field looping down through the hole 14. The trapped magnetic field in a direction which is down through the hole 16 and up through the hole 18 may be said to represent a binary zero.

If another current from the source 20 is applied to the coils 22, 24 and 26, it can be seen that the coil 22, being zero resistive, tends to establish a magnetic field of relatively high intensity down through the hole 14. As a result of this magnetic force, superconductive regions between the holes 14 and 16 are made normal, and the closed lines of flux looping up through the hole 18 and down through the hole 16 travel through the normal regions between the holes 14 and 16 to the hole 14; the mean magnetic path of the lines of flux looping up through the hole 18 is increased, and circulating currents around the hole 18 are increased; consequently superconductive regions between the holes 18 and 16 are made normal, and the magnetic lines of flux in the hole 18 travel through the normal regions to the hole 16, the normal regions reverting to the superconductive state after the magnetic lines of flux pass through on their way to the hole 16. Thus it is seen that a magnetic field is established in a direction that is down through the hole 14 and up through the hole 16 in response to this third current, and zero magnetic field is left in the hole 18. This represents the binary one state which was established with the first current from the current source 8. If further pulses are applied, the flip-flop of Fig. 1 can be made to reverse its state from the existing state to the opposite state in response to successive pulses. The device is capable of maintaining either the binary one or the binary zero condition provided the operating temperature is continued below the critical temperature of the superconductive film 12.

Although the superconductive bistable device of Fig. 4 was originally set either its "0" or "1" state in the "problematical" manner described hereinabove, it is possible to control the presetting of the flip-flop by employing an auxiliary drive coil (not shown), distinct from coils 22 and 26, with each hole 14 and 18. The application of a driving pulse to either of such auxiliary coils will cause the flip-flop to be set to its "0" state or its "1" state depending upon which auxiliary coil was pulsed. Such manner of presetting the superconductive flip-flop would control which initial bistable state is selected, rather than leave such selection to chance. It is to be understood, however, that either method of setting the flip-flop is within the province of the teaching of the instant invention.

The operation of the device in Fig. 5 while essentially similar to that of the device in Fig. 4 differs in at least this respect, i.e., magnetic lines of flux trapped in the holes **14*a* and 16*a* or the holes 16*a* and 18*a* always have the same direction in the hole 16*a* if current flow from the source 20*a* is always in the same direction. Here the hole 16*a* acts as a pivot hole and trapped magnetic lines of flux shift back and forth between the holes 14*a* and 16*a*. Trapped magnetic lines of flux linking the holes 14*a* and 16*a* may be designated as the binary one state, and trapped magnetic lines of flux linking the holes 16*a* and 18*a*** may be designated as the binary zero state.

For the purpose of illustrating the operation of the circuit in Fig. 5, let it be assumed that a flux direction up through the center of a coil is designated as negative and down through the center of a coil is designated as positive. If it is assumed further that flux threads the holes **14*a* and 16*a*, the coils 22*a* and 24*a* over the holes 14*a* and 16*a* are normal. If the conductors 30*a* and 28*a* are pulsed by the current source 20*a* with a current in the direction indicated by the arrows, the spiral coil 26*a* over the hole 18*a* carries the most current because it is superconductive. The area between the holes 14*a* and 18*a* goes normal, and the positive flux in the hole 14*a* is transferred to the hole 18*a*. Thus the coil 22*a* over the hole 14*a* goes superconductive, and the coil 26*a* over the hole 18*a* goes normal. If the conductors 28*a* and 30*a* are again supplied with a current in the same direction from the current source 20*a*, most of the current flows through the coil 22*a*, and the positive flux in the hole 18*a* transfers to the hole 14*a*. Thus the device is a bi-stable flip-flop and can be used as a gate, counter or for other functions. As a further alternative, the coil 26*a* may be pulsed next with a current in the opposite direction and thereby cause a transfer of the positive flux from the hole 16*a* to the hole 18*a*. Hence the device may be used as a tri-stable circuit in which any one of three states can be secured with pulses of proper polarity. Although not essential, a third sense wire similiar to those shown may be employed with the hole 16*a* for sensing purposes when three stable states are utilized. For bi-stable operation the coil 24*a* over the hole 16*a* could be omitted once trapped magnetic flux lines are established linking the hole 16*a* with holes 14*a* or 18*a*. Then the division of current between the coils 22*a* and 26*a*** during a transition from one stable state to another is somewhat simplified.

Figure 6:
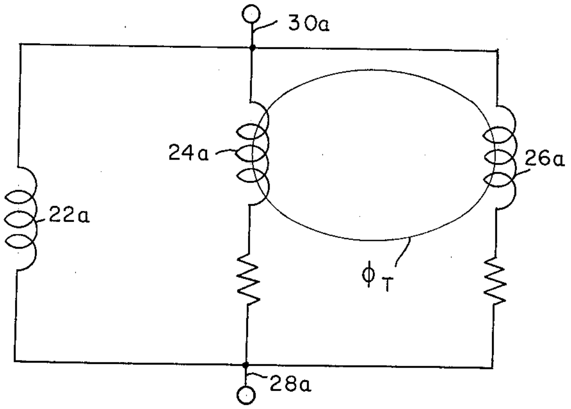
Figs. 6 and 7 are equivalent circuit diagrams of the devices of Figs. 4 and 5.
Figure 7:
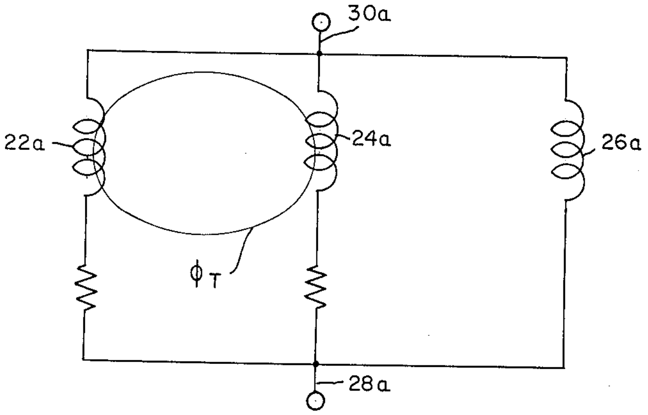

In Fig. 6 is shown the equivalent drive circuit of the device in Fig. 5 with trapped flux ($\phi_T$) linking the holes **16*a* and 18*a* which are associated with respective coils 24*a* and 26*a*. This is the stable condition arbitrarily designated previously as the binary zero state. In Fig. 7 is shown the equivalent drive circuit of Fig. 5 with traped flux ($\phi_T$) linking the holes 16*a* and 14*a* which is the stable condition arbitrarily designated previously as the binary one state. The coils 24*a* and 26*a* in Fig. 6 are each represented as an inductor and a resistor in series because they are normal, and the coil 22*a*** is indicated as an inductor since it is in the superconductive state and not resistive.

In order to illustrate the operation during a change in state, let it be assumed that the zero state exists when a current pulse 50 in Fig. 8*a* is applied across the terminals **30*a* and 28*a*. If the current flows through the branch from terminal 30*a* to terminal 28*a* in Fig. 6, the current divides according to the impedances of the three branches, and therefore the resistive legs carry some current and power is dissipated. However as the inductive reactance of the coil 22*a* becomes smaller with time, the current 52** (Fig. 8*a*) through the coil **22*a* increases and the current 54 through the coils 24*a* and 26*a*** decreases as shown in Fig. 8*a*. It is noted that the currents 52 and 54 through the coils **22*a*, 24*a* and 26*a* equal the applied current 50 at all times. Since a small amount of current flows in the coils 24*a* and 26*a*** at first, this represents not only a power loss but time wasted as a delay. As shown in Fig. 8*a* the time delay occurs between $T_0$ and $T_1$.

As shown in Fig. 8*b* magnetic lines of flux through the coil **26*a* change with time as indicated by curve 56, and the magnetic lines of flux through the coil 22*a* change as indicated by the curve 58**.

As shown in Fig. 8*c* the coils **26*a* and 22*a* change from the normal and superconductive states respectively to the opposite conditions as indicated by respective curves 60 and 62. It is pointed out that the transfer of magnetic lines of flux from the coil 26*a* to the coil 22*a* is effected before the coil 26*a* goes superconductive and the coil 22*a*** goes normal. The curves in Figs. 8*a*, 8*b* and 8*c* are idealized waveforms.

If the coil **24*a* in Fig. 5 is eliminated, assuming that the flux is set up by some means not shown, it can be seen that an equivalent drive circuit similar to that shown in Fig. 9 is effectively presented if the flux loops the holes 14*a* and 16*a*. In Fig. 9 the coil 22*a* has a resistance indicated in series therewith because this coil is normal, and the coil 26*a* has no resistance indicated in the equivalent circuit because this coil is superconductive. Therefore when a pulse is applied to the circuit of Fig. 9, the current divides according to the impedances of the two branches. Obviously neither coil will have an inductive reactance if no flux threads it. Only the flux of leakage can cause inductive reactances of these two flat coils. Any back voltage developed across the coil 22a must come as a result of the flux coming out of the coil 26a. The polarities of the voltages induced as a result of flux leaving the coil 26a and entering the coil 22a are the same. Since the polarities of these induced signals are the same and since the amplitude of these induced voltages in the coils 22a and 26a** is substantially the same, the circuit therefore has very little $L/R$ time constant.

As shown in Fig. 10, the current built up is almost instantaneous in the coil 22a which is indicated by the curve 62. The current through the coil 26a is represented by the curve 64. There is a slight delay to current rise in the coil 22a because of leakage inductance. Another consequence of having the coils coupled mutually in this fashion during a change of state is that since no current circulates in the loop which includes the coils 22a and 26a, there is very little power dissipated because most of the current flow is through the coil 22a.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multistable circuit including a thin film of material in the superconductive state, said film having a plurality of apertures therein, magnetic field producing means for trapping magnetic lines of flux linking at least two of said apertures, superconductive sense means associated with at least one of said apertures, said sense means having a critical magnetic field that is less than said linking lines of flux and providing a resistive condition in response to magnetic lines of flux trapped in the associated aperture.

2. The apparatus of claim 1 wherein said magnetic field producing means includes a second superconductive element which, in response to a current therethrough transfers the trapped magnetic lines of flux from one of the holes in said film to another hole in said film.

3. The apparatus of claim 1 wherein said superconductive device includes a plurality of parallel connected coils associated with the apertures in said film, said coils responding to trapped magnetic lines of flux to provide a resistive condition, whereby current diverted from coils associated with holes in said film containing trapped magnetic lines of flux to coils in the superconductive state causes the transfer from one hole having trapped magnetic lines of flux to another hole previously having no trapped magnetic lines of flux.

4. A device including a plate of material in the superconductive state, said material having a plurality of apertures therein, a plurality of drive coils associated with said apertures, a current source coupled to said drive coils for trapping magnetic lines of flux in two of said holes, said drive coils being constructed of a superconductive material having a critical magnetic field not exceeding that of the trapped flux, and sense means associated with at least one of said apertures, said sense means having a critical magnetic field that is less than that of the trapped flux.

5. A device including a plate of material in the superconductive state, said plate having a plurality of apertures therein, a plurality of drive coils connected in parallel to a source of current pulses, said drive coils being associated with said apertures and being constructed of a superconductive material, whereby a current pulse through said drive coils causes a trapped magnetic field to be established in a pair of apertures in said plate and successive current pulses cause the trapped magnetic field to transfer from at least one aperture to another, said drive coils each having a critical magnetic field that is less than the field of such trapped magnetic flux, and means responsive to the trapped magnetic field for indicating the condition of said device.

6. The apparatus of claim 5 wherein said drive coils have a time of transition from the superconductive state to the normal state which is longer than the time it takes a trapped field to transfer from one aperture to another.

7. The apparatus of claim 6 wherein said last named means includes a superconductive material associated with at least one of said apertures, said material having a critical magnetic field the intensity of which is less than the intensity of the trapped magnetic field.

8. Device including a plate of material in the superconductive state, said plate having first, second and third apertures therein, first, second and third drive coils constructed of superconductive material and associated with the first and second apertures of said plate, a source of current pulses connected in parallel with said drive coils, whereby a current pulse in said drive coils establishes a trapped magnetic field in said first and third apertures representing one stable state, the intensity of the critical magnetic field of said drive coils being less than said trapped magnetic field intensity whereby said first and third drive coils are rendered normal and a succeeding current pulse to said drive coils causes a transfer of trapped magnetic field to the second and third apertures of said plate, succeeding current pulses cause said magnetic field to transfer back and forth between the first and second apertures of said plate, a sense circuit including first and second sense wires associated with the first and second apertures of said plate, said sense wires being constructed of a superconductive material having a critical magnetic field, the intensity of which is less than the intensity of the trapped magnetic field, a source of current connected in parallel with said sense wires whereby the normal one of said sense wires diverts current from said source of current to the superconductive one of said sense wires, the normal and superconductive state of said sense wires being determined by the location of trapped magnetic lines of flux.

No references cited.